US012305845B1

(12) United States Patent
Lin et al.

(10) Patent No.: US 12,305,845 B1
(45) Date of Patent: May 20, 2025

(54) SHOE LIGHT WITH SWITCHABLE COLOR TEMPERATURE

(71) Applicant: Putian Xidengke Optoelectronic Technology Co., Ltd., Fujian (CN)

(72) Inventors: Jianhong Lin, Fujian (CN); Hanliang Lin, Fujian (CN); Chengxi Lin, Fujian (CN)

(73) Assignee: Putian Xidengke Optoelectronic Technology Co., Ltd., Putian (CN)

( * ) Notice: Subject to any disclaimer, the term of this patent is extended or adjusted under 35 U.S.C. 154(b) by 0 days.

(21) Appl. No.: 18/917,703

(22) Filed: Oct. 16, 2024

(51) Int. Cl.

| | |
|---|---|
| ***F21V 33/00*** | (2006.01) |
| ***F21L 4/00*** | (2006.01) |
| ***F21V 23/00*** | (2015.01) |
| ***F21V 23/04*** | (2006.01) |

(52) U.S. Cl.
CPC ............ *F21V 33/0008* (2013.01); *F21L 4/00* (2013.01); *F21V 23/003* (2013.01); *F21V 23/0442* (2013.01)

(58) Field of Classification Search
CPC ............... F21V 33/0008; F21V 23/003; F21V 23/0442; F21V 33/0004; F21V 33/00; F21V 23/04; F21V 23/004; F21V 23/00; F21L 4/00
See application file for complete search history.

(56) References Cited

U.S. PATENT DOCUMENTS

2016/0338441 A1* 11/2016 London .................... A43B 3/36
2023/0050793 A1* 2/2023 Jones .................. F21V 33/0004

* cited by examiner

*Primary Examiner* — Bao Q Truong

(57) ABSTRACT

A shoe light with switchable color temperature is disclosed, which relates to the technical field of shoe lights, including a substrate. Herein a microprocessor is fixedly mounted in an upper surface of the substrate, and a processor pin is fixedly connected to an outer surface of the microprocessor. The processor pin is welded to the upper surface of the substrate, and the upper surface of the substrate is welded sequentially with a first resistor and a second resistor at one side. A connecting wire is welded on an undersurface of the substrate to connected with a capacitor through the connecting wire, the undersurface of the substrate is connected with a conductive plate. The upper surface of the substrate is welded with a seventh welding spot at the one side, and one end of the seventh welding spot is provided with a gated control module.

10 Claims, 4 Drawing Sheets

SHOE LIGHT WITH SWITCHABLE COLOR TEMPERATURE

TECHNICAL FIELD

The present application relates to the technical field of shoe lights, and in particular to a shoe light with switchable color temperature.

BACKGROUND

Shoe light is a kind of small LED light installed on the top of shoes, used for lighting, decoration and warning. Since many people are afraid of darkness and it will be more dangerous when walking at night, as well as many people have a habit of running at night, it will be inconvenient to hold a flashlight in the hand. Existing shoe lights are mostly tied on the laces or directly attached onto the soles of shoes, but most of the shoe lights do not have a simple mounting mechanism, resulting in troublesome mounting and dismounting, which is not conducive to the development of the shoe lights in the footwear manufacturing industry. It is therefore proposed an easy-to-mount shoe light.

Most of the shoe lights in existing technologies are not easy to switch a color temperature of the light when the light is emitting, according to the different walking pace to switch to get a more cool lighting effect, and the light emitting control of the shoe lights is relatively simple, not easy to change the color temperature light display.

Therefore, it is propose a novelty shoe light with switchable color temperature to solve above problems.

SUMMARY

The present disclosure aims to provide a novelty shoe light with switchable color temperature to address problems discussed in the background.

To achieve above objectives, the present disclosure adopts the following technical solutions. In some embodiments of the present disclosure, a shoe light with switchable color temperature is provided, including a substrate. Herein a microprocessor is fixedly mounted in an upper surface of the substrate, and a processor pin is fixedly connected to an outer surface of the microprocessor. The processor pin is welded to the upper surface of the substrate, and the upper surface of the substrate is welded sequentially with a first resistor and a second resistor at one side. A connecting wire is welded on an undersurface of the substrate to connected with a capacitor through the connecting wire, the undersurface of the substrate is connected with a conductive plate and provided with a lithium battery, and the lithium battery is attached to the conductive plate on one side of an outer surface. The upper surface of the substrate is welded with a seventh welding spot at the one side, and one end of the seventh welding spot is provided with a gated control module. And the gated control module includes a seventh wire fixedly connected the one end of the seventh welding spot, and the one end of the seventh wire is fixedly connected with a gated connector externally connected to a control circuit.

Preferably, the upper surface of the substrate is fixedly connected with fixed rods, an upper surface of the fixed rods is fixedly connected with a connecting plate, and an upper surface of the connecting plate is provided with a pressure sensing module. The pressure sensing module includes connecting springs fixedly connected to the upper surface of the connecting plate, the connecting springs are fixedly connected with a pressure sensing plate at an upper end, the upper surface of the connecting plate is welded with a fifth welding spot, and one end of the fifth welding spot is fixedly connected to a fifth wire.

Preferably, the upper surface of the substrate is welded with a fourth welding spot at the one side, one end of the fourth welding spot is fixedly connected with a fourth wire, the fourth wire is fixedly connected with a pressure sensor at one end, and an upper surface of the pressure sensor is fixedly connected with the fifth wire.

Preferably, the upper surface of the substrate is welded with a sixth welding spot at the one side, one end of the sixth welding spot is fixedly connected with a sixth wire, and one end of the sixth wire is fixedly connected with a temperature sensor.

Preferably, the upper surface of the substrate is provided with a light-emitting mechanism at the one side, the light-emitting mechanism includes a first welding spot welded to another side of the upper surface of the substrate, and one end of the first welding spot is fixedly connected to a first wire. The first wire is plugged into a wire joint at one end, the wire joint is opened with a slot on one side of an outer surface, and one end of the wire joint is plugged into a connector. The connector is fixedly connected with a second wire on surface of one end, and one end of the second wire is fixedly connected to a second welding spot. The second welding spot is welded with a light board on a bottom surface, and the light board has jacks running through an upper surface, and the jacks have bent pieces snapped to inside. One end of the bent pieces is fixedly connected with a light base, and one end of surface of the light base is fixedly connected with luminous lights.

Preferably, the upper surface of the substrate is welded with a plurality of third welding spots in sequence at the one end and one end of each third welding spot is fixed connected with a third wire, the third wire is fixedly connected with a diode at one end, and the diode is sleeved with a transparent case on one end of an outer surface.

Preferably, the jacks are symmetrically distributed at both ends of an outer surface of the light board, and another side of the outer surface of the light board is attached to the outer surface of the light base where mounted with luminous lights in an equally spaced sequence.

Preferably, the fixed rods are symmetrical distributed in four corners of the upper surface of the substrate and the fixed rods are made of acrylic, the connecting plate is made of acrylic, and a middle of an upper surface of the connecting plate where corresponding to an underneath of the pressure sensing plate is snapped with a circular metal plate.

Preferably, the connecting springs are distributed on an undersurface of the pressure sensing plate in an equally spaced sequence, and the connecting springs are energized through a fourth welding spot.

Preferably, a 74HC138 decoder, a 74HC573 latch, 74HC02 or NOT gate is used in a circuit connected to the gated connector of the gated control module.

Compared with the existing technologies, the shoe light with switchable color temperature of the present disclosure has at least the following beneficial effects and advantages.

By setting the gated control module to control the luminous lights and diode on and off, with the 74HC138 decoder, the 74HC573 latch, and the 74HC02 or the NOT gate to overall control of the gated circuit. Mainly in a case of LE is the high level, control P0 that is to control the LED lights on and off, simple and efficient control, while the gated control module is communicated with the pressure sensing module communication, thereby achieving different pressures under the presentation of different color temperatures of lights, and flexible switching.

By welding the third welding spots on one side of the upper surface of the substrate in turn, and the third welding spots are connected to the diodes in sequence, the plurality of diodes work on the luminous lights for photoelectric control, due to the stability of the diodes as well as the optionality of multiple types, the stability is greatly improved when used, making the color temperature switching of the light of the shoe light more convenient.

By setting the pressure sensing module to make the pressure sensing plate therein can directly sense the pressure of the foot on the sole when walking, and the pressure is not the same when stepping down or lifting up the foot every time. Different pressures are monitored by the pressure sensor, with the electrical signals are converted into digital signals and sent to the microprocessor for signal processing. Then according to the signal of different pressure values, the command of switching color temperature is sent to the luminous lights for illumination, which can improve the diversity of switching modes.

Figure 1:
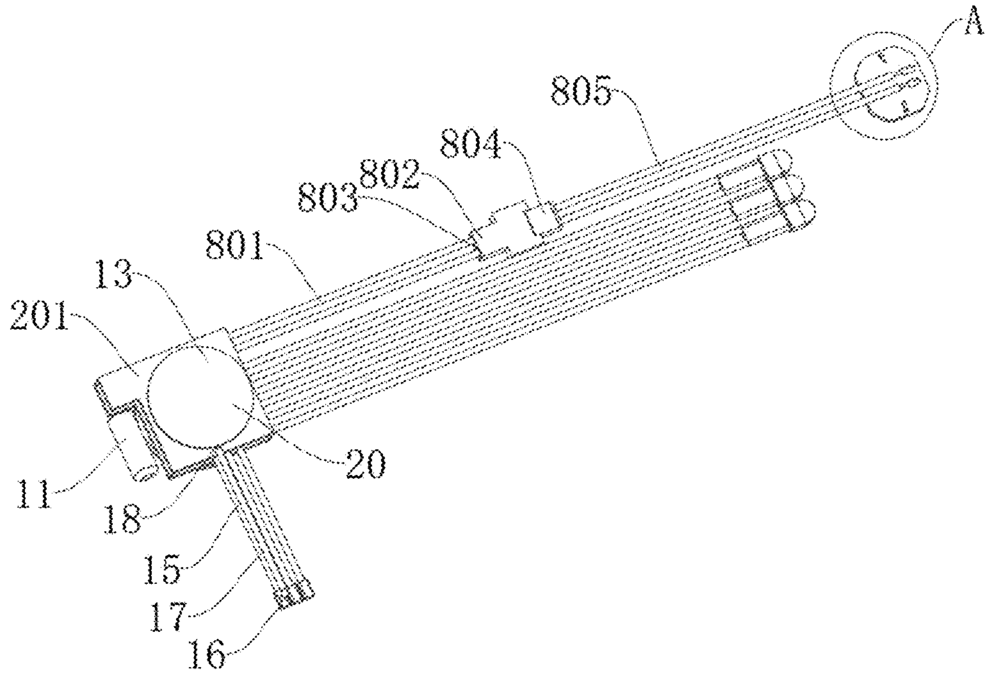
FIG. 1 shows a structure schematic diagram of a first view of a shoe light with switchable color temperature in accordance with some embodiments of the present disclosure.
Figure 2:
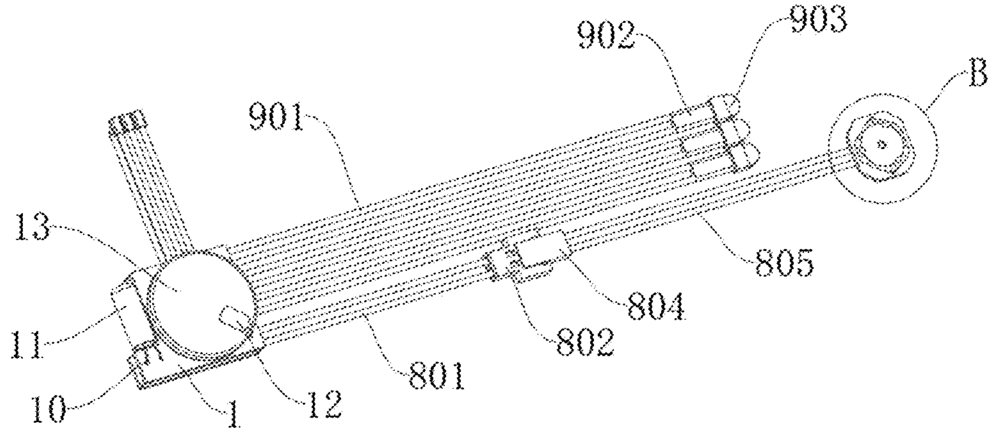
FIG. 2 shows a structure schematic diagram of a second view of the shoe light with switchable color temperature in accordance with some embodiments of the present disclosure.
Figure 3:
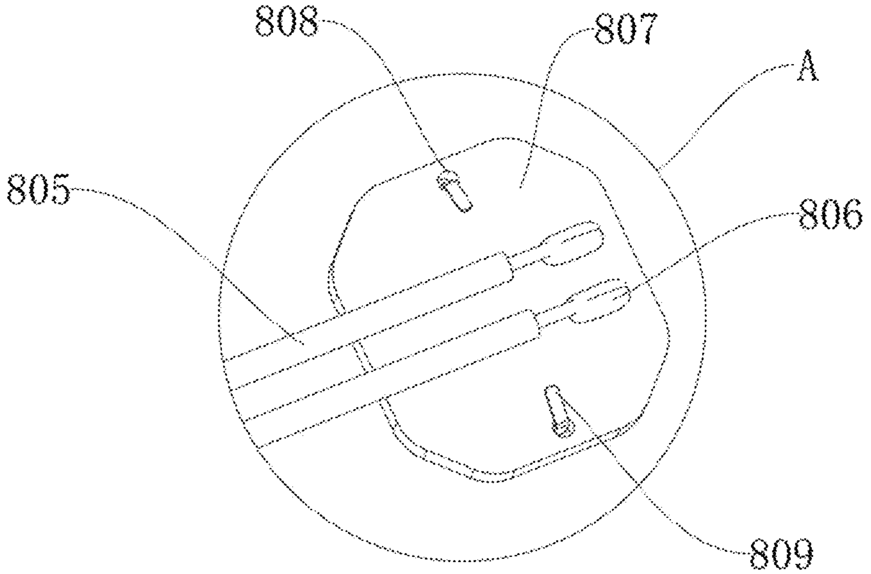
FIG. 3 shows a local enlarged structure schematic diagram at A in FIG. 1.
Figure 4:
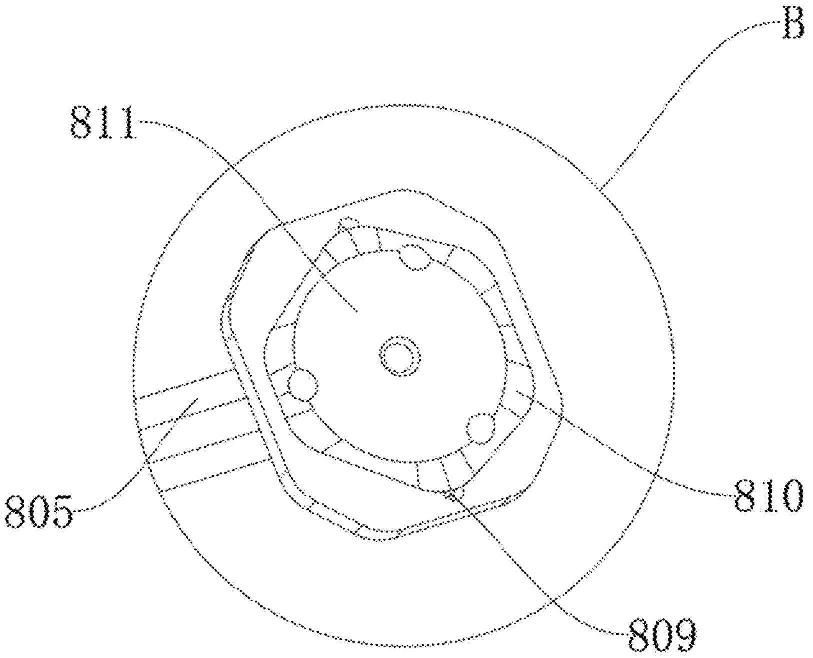
FIG. 4 shows a local enlarged structure schematic diagram at B in FIG. 2.

In the drawings, reference signs are as follows. 1. Substrate, 2. Fixed rod, 3. Connecting plate, 4. First resistor, 5. Second resistor, 6. Microprocessor, 7. Processor pin, 8. First welding spot, 801. First wire, 802. Wire joint, 803. Slot, 804. Connector, 805. Second wire, 806. Second welding spot, 807. Light board, 808. Jack, 809. Bent piece, 810. Light base, 811. Luminous light, 9. Third welding spot, 901. Third wire, 902. Diode, 903. Transparent case, 10. Connecting wire, 11. Capacitor, 12. Conductive plate, 13. Lithium battery, 14. Fourth welding spot, 15. Fourth wire, 16. Pressure sensor, 17. Fifth wire, 18. Fifth welding spot, 19. Connecting spring, 20. Pressure sensing plate, 21. Sixth welding spot, 22. Sixth wire, 23. Temperature sensor, 24. Seventh welding spot, 25. Seventh wire, 26. Gated connector.

DETAILED DESCRIPTION OF THE EMBODIMENTS

The technical solutions in the embodiments of the present disclosure will be clearly and completely described below in conjunction with the accompanying drawings, and it is obvious that the embodiments described are only a part of the embodiments of the present disclosure and not all of the embodiments. Based on the embodiments of the present disclosure, all other embodiments obtained by a person of ordinary skill in the art without making creative labor shall fall within the scope of protection of the present invention.

Herein the term "color temperature" refers to the degree of warmth or coolness of the color of the light emitted by the light source, it is a parameter used to describe the color characteristics of the light emitted by the light source. The unit of color temperature is Kelvin (K), and the commonly used color temperature range is 1000K to 10000K. the term "substrate" refers to those substrate commonly used in the art, including but not limited to, aluminum substrate, copper substrate, printed circuit board, etc.

Embodiment 1

As shown in FIG. 1 to FIG. 7, in some embodiments of the present disclosure, a shoe light with switchable color temperature is provided, including a substrate 1. Herein a microprocessor 6 is fixedly mounted in an upper surface of the substrate 1, and a processor pin 7 is fixedly connected to an outer surface of the microprocessor 6. The processor pin 7 is welded to the upper surface of the substrate 1, and the upper surface of the substrate 1 is welded sequentially with a first resistor 4 and a second resistor 5 at one side. A connecting wire 10 is welded on an undersurface of the substrate 1 to connected with a capacitor 11 through the connecting wire 10, the undersurface of the substrate 1 is connected with a conductive plate 12 and also provided with a lithium battery 13, and the lithium battery 13 is attached to the conductive plate 12 on one side of an outer surface. The upper surface of the substrate 1 is welded with a seventh welding spot 24 at the one side, and one end of the seventh welding spot 24 is provided with a gated control module.

The gated control module includes a seventh wire 25 fixedly connected the one end of the seventh welding spot 24, and the one end of the seventh wire 25 is fixedly connected with a gated connector 26 externally connected to a control circuit. A 74HC138 decoder, a 74HC573 latch, 74HC02 or NOT gate is used in a circuit connected to the gated connector of the gated control module.

The upper surface of the substrate 1 is provided with a light-emitting mechanism at the one side, the light-emitting mechanism includes a first welding spot 8 welded to another side of the upper surface of the substrate 1, and one end of the first welding spot 8 is fixedly connected to a first wire 801. The first wire 801 is plugged into a wire joint 802 at one end, the wire joint 802 is opened with a slot 803 on one side of an outer surface, and one end of the wire joint 802 is plugged into a connector 804. The connector 804 is fixedly connected with a second wire 805 on surface of one end, and one end of the second wire 805 is fixedly connected to a second welding spot 806. The second welding spot 806 is welded with a light board 807 on a bottom surface, and the light board 807 has jacks 808 running through an upper surface, and the jacks 808 have bent pieces 809 snapped to inside. One end of the bent pieces 809 is fixedly connected with a light base 810, and one end of a surface of the light base 810 is fixedly connected with luminous lights 811. The upper surface of the substrate 1 is welded with a plurality of third welding spots 9 in sequence at the one end, and one end of each third welding spot 9 is fixed connected with a third wire 901, the third wire 901 is fixedly connected with a diode 902 at one end, and the diode 902 is sleeved with a transparent case 903 on one end of an outer surface.

The jacks 808 are symmetrically distributed at both ends of an outer surface of the light board 807, and another side of the outer surface of the light board 807 is attached to the outer surface of the light base 810 where mounted with luminous lights 811 in an equally spaced sequence.

In the embodiments of the present disclosure, the gated control module uses a 74HC138 decoder, in which three inputs control the minimum effective output of an eight-way mutual exclusion, and the minimum effective output of an eight-way mutual exclusion through the control inputs can only be controlled one way each time as the output of a low level. The left three inputs through the binary to select the right output Y0-Y7, P25 corresponds to A for the lowest bit, P26 corresponds to B as the second bit, and P27 corresponds to C as the highest bit, and a 74HC573 latch is used as a non-inverting transparent latch for the eight-3-state outputs, in which the non-inverting means that the inputs and outputs remain the same. When the latch enable terminal LE is high, the stored output of these devices to keep synchronized with the input. When the latch enable LE is low, the data is latched, so that the data sent by the microprocessor 6 is processing. In the case of the gated control module controls the LE being high, control P0 means that the luminous light 811 on and off, and the luminous light 811 on and off uses the following codes:

```
#include <REG52. H>
sbit HC138_A=P2ˆ5; //fixed fire pin
sbit HC138_B=P2ˆ6;
sbit HC138_C=P2ˆ7;
void Delay(unsigned char xms)//@11.0592 MHz//DeLay
  function
  {
unsigned char data i, j;
while (xms--) {
i=2;
j=199;
do
  {
while (--j);
} while (--i);
}
}
void main( )
  {
while (1)
  {
int i,t;
HC138_A=0; //select Y4
HC138_B=0;
HC138_C=1;
for (i=8; i<3; i++)
  {
p0=0x00;
Delay (1000);
P0=0xff;
}
for (t=1; t<=8; t++)
  {
Pe=0xff<<t; //shift to make the LED light up one by one
}
for (t=1; t<=8; t++)
  {
PO=~(Oxff<<t);
}
}
}
```

Embodiment 2

Figure 5:
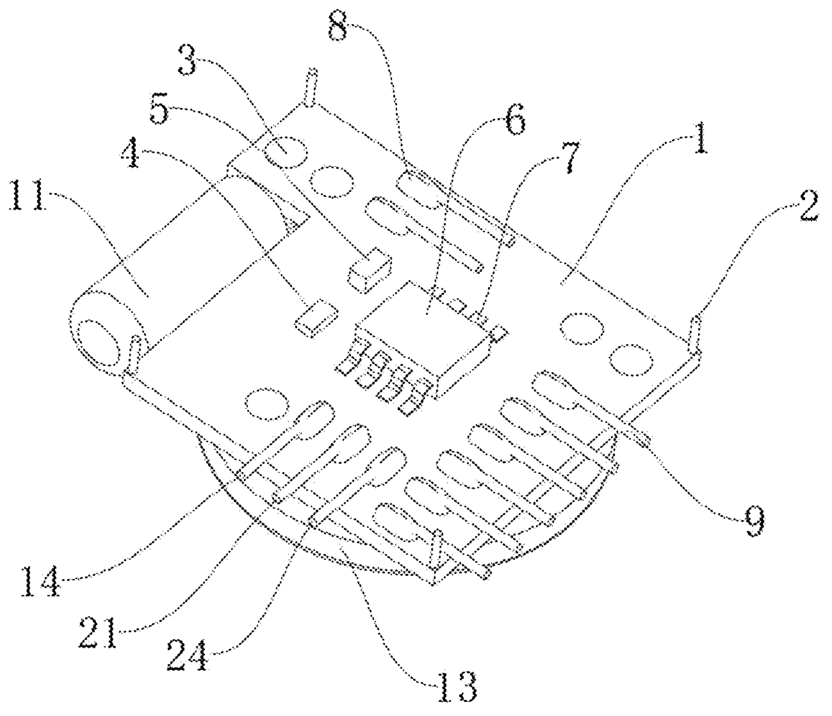
FIG. 5 shows a structure schematic diagram of a substrate in accordance with some embodiments of the present disclosure.

Referring to FIG. 5, the upper surface of the substrate 1 is fixedly connected with fixed rods 2, and the fixed rods 2 are symmetrical distributed in four corners of the upper surface of the substrate 1. The fixed rods 2 are made of acrylic, a connecting plate 3 is made of acrylic and a middle of an upper surface of the connecting plate 3 where corresponding to an underneath of the pressure sensing plate 20 is snapped with a circular metal plate. An upper surface of the fixed rods 2 is fixedly connected with the connecting plate 3, and an upper surface of the connecting plate 3 is provided with a pressure sensing module. The pressure sensing module includes connecting springs 19 fixedly connected to the upper surface of the connecting plate 3, the connecting springs 19 are fixedly connected with a pressure sensing plate 20 at an upper end, the connecting springs 19 are distributed on an undersurface of the pressure sensing plate 20 in an equally spaced sequence, and the connecting springs 19 are energized through a fourth welding spot 14. The upper surface of the connecting plate 19 is welded with a fifth welding spot 18, and one end of the fifth welding spot 18 is fixedly connected to a fifth wire 17.

In some embodiments of the present disclosure, the acrylic fixed rods 2 is connected with the connecting plate 3, so that the fixed rods 2 and the connecting plate 3 have high strength, so when stepping under the soles of the foot, its pressure will not affect the substrate 1, and at the same time, the pressure sensing plate 20 senses the pressure. The electrical signals generated by the pressure values sensed by the pressure sensing plate 20 are transmitted to the pressure sensor 16 for monitoring through the fifth wire 17 to monitor different pressure values, which are converted to digital signals for switching the color temperature of the luminous lights 811.

Embodiment 3

Figure 6:
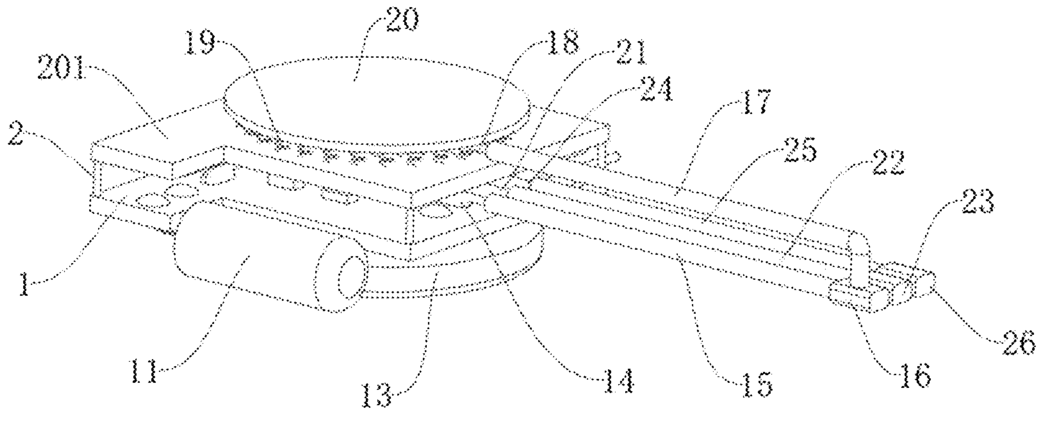
FIG. 6 shows a structure schematic diagram of a pressure sensing module in accordance with some embodiments of the present disclosure.
Figure 7:
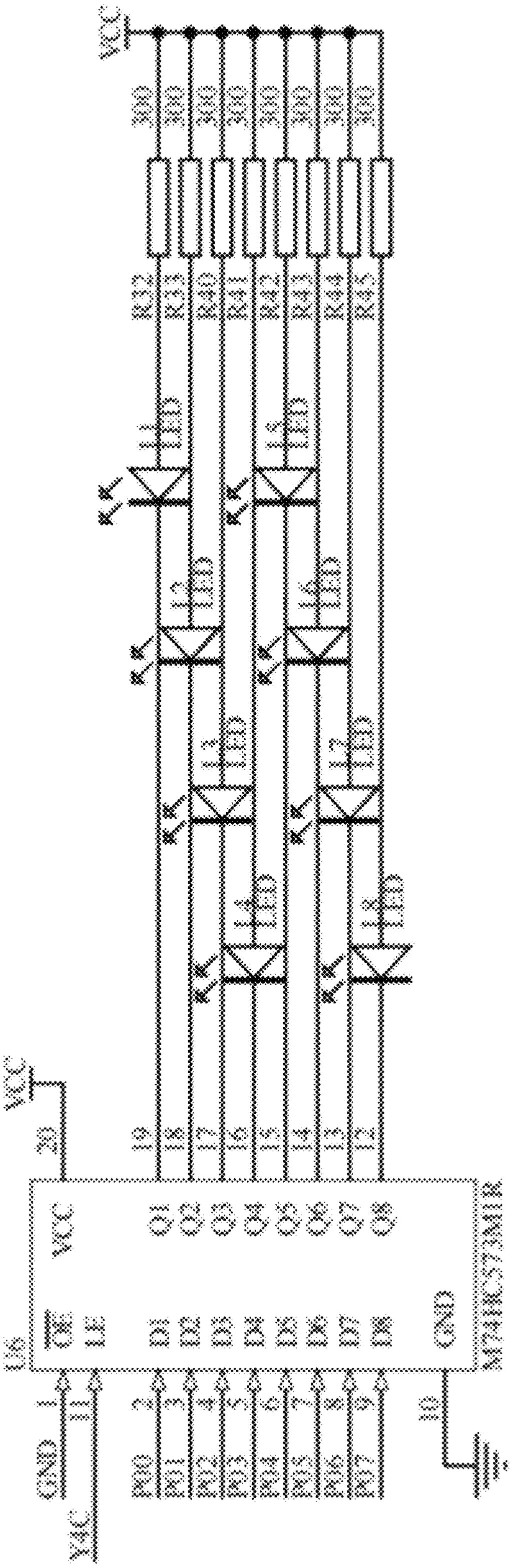
FIG. 7 shows a circuit structure schematic diagram of a gated circuit for controlling LED lights on and off in accordance with some embodiments of the present disclosure.

Referring to FIG. 6, the upper surface of the substrate 1 is welded with a fourth welding spot 14 at the one side, one end of the fourth welding spot 14 is fixedly connected with a fourth wire 15, the fourth wire 15 is fixedly connected with a pressure sensor 16 at one end, and an upper surface of the pressure sensor 16 is fixedly connected with the fifth wire 17.

The upper surface of the substrate 1 is welded with a sixth welding spot 21 at the one side, one end of the sixth welding spot 21 is fixedly connected with a sixth wire 22, and one end of the sixth wire 22 is fixedly connected with a temperature sensor 23.

In the embodiments of the present disclosure, the pressure sensor 16 monitors the pressure values and converts the electrical signals into the digital signals, and sends a real-time pressure value to the microprocessor 6. Moreover, the temperature sensor 23 monitors the temperature in the shoes in real time, and according to different pressure values and different temperature values, a color temperature switching instruction is sent to the gated control module through the microprocessor 6 to switch the color temperature of the luminous lights 811.

Although embodiments of the present disclosure have been shown and described, it will be appreciated by one of ordinary skill in the art that a variety of changes, modifications, substitutions, and variations of these embodiments may be made without departing from the principle and concept of the present invention, the scope of which is limited by the appended claims and their equivalents.

What is claimed is:

1. A shoe light with switchable color temperature, comprising a substrate;

wherein a microprocessor is fixedly mounted in an upper surface of the substrate, and a processor pin is fixedly connected to an outer surface of the microprocessor;

wherein the processor pin is welded to the upper surface of the substrate, and the upper surface of the substrate is welded sequentially with a first resistor and a second resistor at one side;

wherein a connecting wire is welded on an undersurface of the substrate to connected with a capacitor through the connecting wire, the undersurface of the substrate is connected with a conductive plate and provided with a lithium battery, and the lithium battery is attached to the conductive plate on one side of an outer surface;

wherein the upper surface of the substrate is welded with a seventh welding spot at the one side, and one end of the seventh welding spot is provided with a gated control module; and wherein the gated control module comprises a seventh wire fixedly connected the one end of the seventh welding spot, and the one end of the seventh wire is fixedly connected with a gated connector externally connected to a control circuit.

2. The shoe light with switchable color temperature according to claim 1, wherein the upper surface of the substrate is fixedly connected with fixed rods, an upper surface of the fixed rods is fixedly connected with a connecting plate, and an upper surface of the connecting plate is provided with a pressure sensing module; and wherein the pressure sensing module comprises connecting springs fixedly connected to the upper surface of the connecting plate, the connecting springs are fixedly connected with a pressure sensing plate at an upper end, the upper surface of the connecting plate is welded with a fifth welding spot, and one end of the fifth welding spot is fixedly connected to a fifth wire.

3. The shoe light with switchable color temperature according to claim 1, wherein the upper surface of the substrate is welded with a fourth welding spot at the one side, one end of the fourth welding spot is fixedly connected with a fourth wire, the fourth wire is fixedly connected with a pressure sensor at one end, and an upper surface of the pressure sensor is fixedly connected with the fifth wire.

4. The shoe light with switchable color temperature according to claim 1, wherein the upper surface of the substrate is welded with a sixth welding spot at the one side, one end of the sixth welding spot is fixedly connected with a sixth wire, and one end of the sixth wire is fixedly connected with a temperature sensor.

5. The shoe light with switchable color temperature according to claim 1, wherein the upper surface of the substrate is provided with a light-emitting mechanism at the one side, the light-emitting mechanism comprises a first welding spot welded to another side of the upper surface of the substrate, and one end of the first welding spot is fixedly connected to a first wire;

wherein the first wire is plugged into a wire joint at one end, the wire joint is opened with a slot on one side of an outer surface, and one end of the wire joint is plugged into a connector;

wherein the connector is fixedly connected with a second wire on surface of one end, and one end of the second wire is fixedly connected to a second welding spot;

wherein the second welding spot is welded with a light board on a bottom surface, and the light board has jacks running through an upper surface, and the jacks have bent pieces snapped to inside; and wherein one end of the bent pieces is fixedly connected with a light base, and one end of surface of the light base is fixedly connected with luminous lights.

6. The shoe light with switchable color temperature according to claim 1, wherein the upper surface of the substrate is welded with a plurality of third welding spots in sequence at the one end and one end of each third welding spot is fixed connected with a third wire, the third wire is fixedly connected with a diode at one end, and the diode is sleeved with a transparent case on one end of an outer surface.

7. The shoe light with switchable color temperature according to claim 5, wherein the jacks are symmetrically distributed at both ends of an outer surface of the light board, and another side of the outer surface of the light board is attached to the outer surface of the light base where mounted with luminous lights in an equally spaced sequence.

8. The shoe light with switchable color temperature according to claim 2, wherein the fixed rods are symmetrical distributed in four corners of the upper surface of the substrate and the fixed rods are made of acrylic, the connecting plate is made of acrylic, and a middle of an upper surface of the connecting plate where corresponding to an underneath of the pressure sensing plate is snapped with a circular metal plate.

9. The shoe light with switchable color temperature according to claim 2, wherein the connecting springs are distributed on an undersurface of the pressure sensing plate in an equally spaced sequence, and the connecting springs are energized through a fourth welding spot.

10. The shoe light with switchable color temperature according to claim 1, wherein a 74HC138 decoder, a 74HC573 latch, 74HC02 or NOT gate are used in a circuit connected to the gated connector of the gated control module.

* * * * *